US006809160B2

(12) United States Patent
Tsuboniwa et al.

(10) Patent No.: US 6,809,160 B2
(45) Date of Patent: Oct. 26, 2004

(54) FLEXIBLE HYDROPHOBIC RESIN WITH SULFONIUM AND PROPARGYL GROUPS-CONTAINING RESIN

(75) Inventors: Noriyuki Tsuboniwa, Nagaokakyo (JP); Motoki Fujii, Osaka (JP); Ichiro Kawakami, Takatsuki (JP); Takayuki Kokubun, Suita (JP); Hiroyuki Sakamoto, Kobe (JP)

(73) Assignee: Nippon Paint Co., Ltd., Osaka (JP)

( * ) Notice: Subject to any disclaimer, the term of this patent is extended or adjusted under 35 U.S.C. 154(b) by 27 days.

(21) Appl. No.: 09/992,013

(22) Filed: Nov. 26, 2001

(65) Prior Publication Data

US 2002/0188070 A1 Dec. 12, 2002

(30) Foreign Application Priority Data

Nov. 27, 2000 (JP) ........................................ 2000-358901

(51) Int. Cl.[7] .................. C08L 33/14; C08L 63/04; C08L 67/06; C08L 71/02; C08L 75/14
(52) U.S. Cl. .................. 525/438; 523/414; 525/65; 525/118; 525/407; 525/454; 525/463; 525/502; 525/525; 525/528; 525/529; 525/531
(58) Field of Search .................. 523/414; 525/438, 525/65, 118, 407, 454, 463, 502, 525, 528, 529, 531

(56) References Cited

U.S. PATENT DOCUMENTS 6,106,684 A * 8/2000 Kawakami et al. ......... 204/504
6,168,864 B1 * 1/2001 Sakamoto et al. .......... 428/413
6,262,146 B1 * 7/2001 Sakamoto et al. .......... 523/404

FOREIGN PATENT DOCUMENTS

| EP | 0 733 681 A2 | 9/1919 |
| EP | 0 351 135 A2 | 1/1990 |
| EP | 0 442 533 A1 | 8/1991 |
| EP | 0 852 252 A1 | 7/1998 |

* cited by examiner

Primary Examiner—Robert Sellers
(74) Attorney, Agent, or Firm—Sughrue Mion, PLLC

(57) ABSTRACT

A resin composition comprises a resin (A) and a resin (B) as constituents, said resin (A) having a number average molecular weight of 1,000 to 35,000 and being at least one member selected from the group consisting of following (A1) and (A2):

(A1) a polyester polyol, a polyether polyol, a polycarbonate polyol, a polyurethane polyol, a polyolefin polyol and an acrylic polyol, (A2) a polymer obtained by reacting said (A1) with a compound having at least one functional group selected from the group consisting of isocyanato, carboxyl and epoxy groups within a molecule thereof, a dialkyl carbonate, a cyclic carbonate, an alcohol, or a mixture of these, and said resin (B) having a sulfonium group and a propargyl group within the molecule thereof.

10 Claims, No Drawings

FLEXIBLE HYDROPHOBIC RESIN WITH SULFONIUM AND PROPARGYL GROUPS-CONTAINING RESIN

TECHNICAL FIELD

The present invention relates to a resin composition which can suitably be used in a cationic electrodeposition coating and, more particularly, to a resin composition which, when used in a cationic electrodeposition coating, gives electrodeposited coating films excellent in flexibility and, further, in impact resistance, chipping resistance and so forth and to a cationic electrodeposition coating composition using such resin composition.

BACKGROUND ART

Cationic electrodeposition coating technology has been generally used as an undercoating method of articles to be coated which are large and complicated in shape and are required to have high rust prevention, such as car bodies, since even details of those articles complicated in shape can be coated in an automated and continuous manner by that technology. As compared with other coating methods, the technology is highly efficient from the viewpoint of coating consumption, hence economical, and has come into wide use as an industrial coating method.

Cationic electrodeposition coating is carried out by immersing an article to be coated, which is to serve as a cathode, in a cationic electrodeposition coating composition and applying a voltage. The deposition of a coat in the process of this coating is based on an electrochemical reaction. The coat deposited on the surface of the article to be coated upon voltage application has an insulating property, so that as the film thickness of the deposited coat increases with proceeding of the deposition of the coat in the process of coating, the electric resistance of the coat increases proportionally to the increase in film thickness. As a result, the deposition of the coating on that site decreases and, instead, coat deposition starts on a site where any coat has not yet been deposited. In this manner, coating emulsion particles deposit on undeposited sites successively to thereby complete coating. In the present specification, such successive formation of a coat on undeposited sites of an article to be coated is referred to as "throwing power".

Such cationic electrodeposition coating is generally employed in undercoating mainly for the purpose of rust prevention and, therefore, it is required that even in the case of an article to be coated having a complicated structure, the film thickness of a coat is not less than a certain predetermined value at every site. Accordingly, it is required that a sufficient level of throwing power be secured.

As a cationic electrodeposition coating excellent in throwing power, for example, WO 98/03701 discloses a cationic electrodeposition coating composition which comprises a fundamental resin containing a triple bond, such as an ethynyl or nitrile group, within the molecule.

On the other hand, the coating films formed on articles to be coated as car bodies are required to be sufficiently protected from damaging due to collision with grains of sand, pebbles or the like during driving. It is thus essential to strive for improving the so-called impact resistance. For improving the impact resistance, it has been a general practice to improve the physical properties of the topcoat coating film and intermediate coating film. By such means alone, however, it is not always possible to improve the impact resistance to a satisfactory extent. Generally, a coating film is constituted of a plurality of multilayer coating films and, therefore, it is necessary to strive to improve the impact resistance of the coating film as a whole. If, in particular, the physical properties of an electrodeposited coating film can be improved and the impact resistance of the coating film as a whole can be thereby improved, there will arise the possibility of markedly improving the impact resistance of coating films by using the new technology in combination with the prior art impact resistance related technology.

Japanese Kokai Publication 2000-38527 discloses a resin composition for use in cationic electrodeposition coatings which comprises a resin having an epoxy resin skeleton and containing a sulfonium group, an aliphatic hydrocarbon group of 8 to 24 carbon atoms containing an unsaturated double bond within the chain thereof and a propargyl group. It is for the purpose of improving the impact resistance that the resin contains an aliphatic hydrocarbon group of 8 to 24 carbon atoms containing an unsaturated double bond within the chain thereof, such as one derived from linseed oil or a like hydrocarbon compound.

However, while a cresol novolak-based epoxy resin or the like, which has a rigid structure and excellent in strength and corrosion resistance, can be used as the skeleton-forming epoxy resin, this causes the coating films obtained to be lacking in flexibility, hence in impact resistance. Further, although the epoxy group-derived hydroxy group moieties in the epoxy resin have excellent adhesiveness and the propargyl group is an excellent nonvolatile functional group for curability, these increase hydrophilicity of coating films, decrease waterproof property, and cause lack in corrosion resistance.

Thus, the above composition is unsatisfactory from the viewpoint of simultaneous attainment of impact resistance and corrosion prevention of coating films obtained.

In view of the above-mentioned state of the art, it is an object of the present invention to provide a resin composition excellent in throwing power and capable of providing coating films excellent in corrosion prevention as well as in impact resistance, and a cationic electrodeposition coating composition containing this resin composition.

SUMMARY OF THE INVENTION

The present inventors found that when a resin (A) having a flexible and hydrophobic structure is used as a core and a resin (B) containing a sulfonium group and a propargyl group, which are excellent in throwing power, is used as a shell, the impact resistance and chipping resistance of coating films can be improved while maintaining the excellent throwing power and corrosion prevention of coating films. Based on such findings, they have now completed the present invention.

It was further found that the oil repellency, corrosion prevention, curability, workability and adhesiveness and so forth, can also be further improved depending on the performance characteristics of the main chain of the resin (A) to be used as the core. Thus, the resin (A) to be used as the core can be selected according to the required purpose.

The present invention thus provides a resin composition which comprises a resin (A) and a resin (B) as constituents, said resin (A) having a number average molecular weight of 1,000 to 35,000 and, being at least one member selected from the group consisting of following (A1) and (A2):

(A1) a polyester polyol, a polyether polyol, a polycarbonate polyol, a polyurethane polyol, a polyolefin polyol and an acrylic polyol, (A2) a polymer obtained by reacting said (A1) with a compound having at least one functional group selected from the group consisting of isocyanato, carboxyl and epoxy groups within the molecule thereof, a dialkyl carbonate, a cyclic carbonate, an alcohol, or a mixture of these, and said resin (B) having a sulfonium group and a propargyl group within the molecule thereof.

The invention also provides a cationic electrodeposition coating composition which comprises the above resin composition.

DETAILED DESCRIPTION OF THE INVENTION

In the following the present invention is described in detail.

The resin composition according to the invention comprises a resin (A) and a resin (B) as constituents.

In the resin composition of the invention, said resin (A) serves as a core component and has a flexible and hydrophobic structure. Since the resin (A) is structurally flexible, the coating films obtained can be improved in impact resistance and chipping resistance. Further, since the resin is hydrophobic, the corrosion prevention can be improved. It can form a core/shell structure with the resin (B) to give a stable emulsion.

The above resin (A) is at least one member selected from the group consisting of the above-mentioned (A1) and (A2).

The above (A1) includes polyester polyols, polyether polyols, polycarbonate polyols, polyurethane polyols, polyolefin polyols and acrylic polyols.

As the above polyester polyols, there may be mentioned, for example, products obtained by reacting a polycarboxylic acid, a polycarboxylic acid anhydride and/or ester compound with a polyol.

The above polycarboxylic acid is not particularly restricted but may be any of those having at least two carboxyl groups, including, for example, low-molecular saturated aliphatic polycarboxylic acids such as succinic acid, adipic acid, sebacic acid, glutaric acid, azelaic acid, dodecanedicarboxylic acid and butanetricarboxylic acid; low-molecular unsaturated aliphatic polycarboxylic acids such as maleic acid, fumaric acid and itaconic acid; saturated or unsaturated long-chain polycarboxylic acids such as polybutadienedicarboxylic acid and IPU 22 (product of Okamura Seiyu); and aromatic polycarboxylic acids such as isophthalic acid, terephthalic acid, trimellitic acid and pyromellitic acid. The above polycarboxylic acid anhydride and/or ester compound are/is not particularly restricted but include(s), for example, acid anhydrides derived from those polycarboxylic acids and/or ester compounds derived from those polycarboxylic acids such as methyl and ethyl esters.

Among them, polybutadienedicarboxylic acid is preferred because of its excellent curability and hydrophobicity. Thus, for example, NISSO-PB C1000 (product of Nippon/Soda) and HYCAR CTB and HYCAR CTBN (both being products of Ube Industries) can be used.

The above-mentioned polycarboxylic acids may be used singly or in combination of two or more species.

As an acid component other than the above polycarboxylic acid, there may be contained low-molecular or high-molecular, saturated or unsaturated monocarboxylic acids such as acetic acid, acrylic acid, methacrylic acid, crotonic acid, oleic acid, linolic acid, linseed oil fatty acids and soybean oil fatty acids.

The above polyol is not particularly restricted but may be any of those having at least two hydroxyl groups, including, for example, low-molecular saturated polyols such as ethylene glycol, propylene glycol, 1,4-butanediol, 1,6-hexanediol, 3-methyl-pentanediol, neopentyl glycol, 1,4-cyclohexanediol, 1,4-cyclohexanedimethanol, trimethylolpropane, hydrogenated bisphenol A and hydrogenated bisphenol F; low-molecular unsaturated polyols such as 2-butyne-1,4-diol and 2-butene-1,4-diol; and high-molecular unsaturated polyols such as polybutadiene glycol and polyisoprene glycol. Among them, unsaturated group-containing polybutadiene glycol and 2-butyne-1,4-diol are preferred because of their excellent curability and hydrophobicity, and 2-butyne-1,4-diol is more preferred.

As the above polybutadiene glycol, there may be mentioned Poly bd R-45HT, Poly bd R-45M (both being products of Idemitsu Petrochemical), NISSO-PB G1000 and NISSO-PB G2000 (both being products of Nippon Soda), for instance.

The above polyols may be used singly or in combination of two or more species.

As the above polyester polyols, reaction products from a polycarboxylic acid and an epoxy compound may also be used. The above polycarboxylic acid includes those mentioned above.

The above epoxy compound is not particularly restricted but may be any of those having at least one epoxy group, including, for example, monoglycidyl compounds such as phenyl glycidyl ether and glycidyl (meth)acrylate; epibisepoxy resins such as YDF-170, YDF-803 (both being products of Tohto Kasei), Flep (product of Toray Thiokol) and bisphenol A diglycidyl ether; products derived from the above epibisepoxy resins by chain extension with a diol, dithiol, dicarboxylic acid or diamine or the like; hydrogenation products derived from the above epibisepoxy resins or the above chain-extended compounds; saturated or unsaturated aliphatic polyglycidyl ethers such as polybutadiene diglycidyl ether, for example Denarex R-45EPT (product of Idemitsu Petrochemical); and saturated or unsaturated higher polyglycidyl esters such as IPU22G and SB-20G (products of Okamura Seiyu).

The above-mentioned polycarboxylic acids, the above-mentioned epoxy compounds and/or reaction products thereof may respectively be used singly or in combination of two or more species.

The reaction products mentioned above preferably have an acid value of not more than 20, more preferably not more than 10. If the above-mentioned acid value exceeds 20, emulsification may possibly be difficult in the step of coating preparation.

As the above polyether polyols, there may be mentioned, for example, products obtained by ring opening polymerization of an alkylene oxide or a heterocyclic ether.

The above alkylene oxide is not particularly restricted but includes, for example, ethylene oxide, propylene oxide and butylene oxide.

The above heterocyclic ether is not particularly restricted but includes, for example, cyclic acetals such as 1,3-dioxolane.

The above-mentioned alkylene oxide and/or the above-mentioned heterocyclic ether may respectively be used singly or in combination of two or more species.

As such polyether polyols, there may be mentioned, for example, polyethylene glycol, polypropylene glycol, polyethylene-propylene random glycol and poly(tetraoxymethylene) glycol, and these may be used singly or in combination of two or more species.

Also usable as the above polyether polyols are reaction products from a polyol and a polyepoxy compound. As the above polyol and the above polyepoxy compound, there may be mentioned those mentioned hereinabove.

As the above polycarbonate polyols, there may be mentioned, for example, products obtained by reacting a polyol with a polycarbonate such as an alkylene dicarbonate.

The above polycarbonate polyols are excellent in hydrolysis resistance and superior in water resistance to ordinary esters and, therefore, they can further improve the corrosion prevention of the resin composition obtained.

The above polycarbonate polyols are not particularly restricted but include, for example, polyhexamethylene carbonate diol and polyethylene carbonate diol.

The above polycarbonate polyols may be used singly or in combination of two or more species.

As the above polyurethane polyols, there maybe mentioned, for example, products obtained by reacting a polyol with a polyisocyanate compound. The above polyol includes those mentioned hereinabove.

The above polyurethane polyols are high in cohesive force and have urethane functional groups excellent in hydrolysis resistance, so that they can further improve the workability and adhesiveness of the resin composition obtained.

The above polyisocyanate compound is not particularly restricted but includes, for example, tolylene diisocyanate (TDI), diphenylmethanediisocyanate (MDI), p-phenylene diisocyanate, naphthalenediisocyanate, hexamethylene diisocyanate (HDI), 1,4-cyclohexanediisocyanate and 4,4'-dicyclohexylmethanediisocyanate as well as urethanization products, carbodiimides, ureotines, dimers, trimers and other modifications derived therefrom.

The above polyols and/or polyisocyanate compounds may be used singly or in combination of two or more species.

The above polyolefin polyols include, for example, polymers of a radical-polymerizable monomer having two or more unsaturated double bonds or copolymers of such a radical-polymerizable monomer and another radical-polymerizable monomer, and each polymer or copolymer has at least two hydroxyl groups. The above radical-polymerizable monomer is not particularly restricted but includes, for example, butadiene, isoprene, styrene, methylstyrene and acrylonitrile. As the above polyolefin polyols, there may be mentioned, for example, polybutadiene glycols specifically mentioned hereinabove as polyols, polyisoprene glycols and like high-molecular unsaturated polyols. The above polyolefin polyols are excellent in reactivity and hydrophobicity and can further improve the curability and corrosion prevention of the resin composition obtained. In addition, they are low in SP and, therefore, can further improve the oil repellency of the resin composition obtained.

Particularly preferred as the above polyolefin polyols are ones having polybutadiene derivatives since these are excellent in reactivity and hydrophobicity, in particular, and can provide the resin composition obtained with very good curability and corrosion prevention. The ones having polybutadiene derivatives as mentioned above are not particularly restricted but include, for example, polybutadiene glycols mentioned above.

The above acrylic polyols include, for example, products obtained by copolymerization of (meth)acrylic acid and/or a derivative thereof with a hydroxyl group-containing radical-polymerizable monomer. The above hydroxyl group-containing radical-polymerizable monomer is not particularly restricted but includes, for example, 2-hydroxyethyl acrylate, 2-hydroxyethyl methacrylate, hydroxypropyl acrylate, hydroxypropyl methacrylate, hydroxybutyl acrylate, hydroxybutyl methacrylate, allyl alcohol and methacryl alcohol. The above (meth)acrylic acid derivatives and/or the above hydroxyl group-containing radical-polymerizable monomers may respectively be used singly or in combination of two or more species.

The (A1) mentioned above can be produced in the conventional manner and the above-mentioned commercial products can also be used. The above (A1) may be used singly or in combination of two or more species.

The above-mentioned (A2) includes polymers obtained by reacting the above-mentioned (A1) with a compound having at least one functional group selected from the group consisting of isocyanato, carboxyl and epoxy groups within the molecule thereof, a dialkyl carbonate, a cyclic carbonate, an alcohol, and mixtures of these.

The above isocyanato group-containing compound is not particularly restricted but includes, for example, the above-mentioned polyisocyanate compounds as well as monoisocyanate compounds such as hexyl isocyanate and phenyl isocyanate.

The above carboxyl group-containing compound is not particularly restricted but includes the above-mentioned saturated or unsaturated mono- and poly-carboxylic acids.

The above epoxy group-containing compound is not particularly restricted but includes, for example, the above-mentioned polyepoxy compounds as well as monoepopxy compounds such as phenyl glycidyl ether and glycidyl methacrylate.

The above dialkyl carbonate is not particularly restricted but includes, for example, dimethyl carbonate, diethyl carbonate, dipropyl carbonate and dibutyl carbonate.

The above cyclic carbonate is not particularly restricted but includes, for example, ethylene carbonate, propylene carbonate and the like.

The above alcohol is not particularly restricted but includes, for example, polyols mentioned above as well as saturated and unsaturated monoalcohols such as methanol, ethanol, ally alcohol and propargyl alcohol.

The mode of reacting the above compounds or a mixture of these with the above (A1) is not particularly restricted but, for example, the reaction can be carried out by dissolving the above compound(s) and the above (A1) in a solvent capable of at least partly dissolving them both and stirring the mixture, if necessary under heating and with a catalyst and/or another additive admixed, to thereby cause the reaction.

As regards the above (A2), they can be used as the resin (A) in the practice of the present invention even when the starting material (A1) has not reacted totally but the (A1) partly remains unreacted.

In the practice of the present invention, the resin to be used as the above resin (A) preferably has a functional group capable of effectively reacting with the resin (B). Such functional group can improve the reactivity with the resin (B), as well as the curability, hence leading to the formation of firm coating films. It can improve the corrosion prevention as well.

The above functional group is preferably an unsaturated functional group. When the above resin (A) has an unsaturated functional group, the resin composition obtained can further be improved in curability and corrosion resistance.

The source of introduction of the above unsaturated functional group is not particularly restricted but includes, for example, unsaturated functional group-containing compounds selected from among the groups of compounds mentioned hereinabove. A polydiene derivative and/or an unsaturated triple bond-containing compound are/is preferably used, however.

The above polydiene derivative is not particularly restricted but is preferably a polybutadiene derivative since this can further improve the curability and corrosion prevention of the resin composition, as mentioned above.

The above unsaturated triple bond-containing compound is not particularly restricted but may be any of those containing carbon-carbon triple bond. Propargyl alcohol and 2-butyne-1,4-diol are more preferred, however, since they show good reactivity and compatibility with the main resin, in particular, and can further improve the curability of the resin composition obtained.

The above unsaturated triple bond-containing compound can be used in an amount of 1 to 50% by weight based on the solid matter weight in the resulting resin (A). If the content of the source of introduction of the above unsaturated functional group is less than 1% by weight based on the solid matter weight in the resulting resin (A), the effect of introducing the same will not be sufficiently obtained and, if it exceeds 50% by weight, the hydrophilicity of resin (A) will be increased excessively, whereby the waterproof property of the resulting coating films will be lowered, hence the corrosion prevention will be lacked in some cases. A preferred amount is 5 to 50% by weight.

Particularly preferred as the above resin (A) are polyolefin polyols, polyester polyols obtained by using polyolefindicarboxylic acids and/or polyurethane polyols, since they can give resin compositions excellent in curability and corrosion prevention owing to their having unsaturated bonds. The use of 2-butyne-1,4-diol as a monomer is also particularly preferred.

The above resin (A) has a number average molecular weight of 1,000 to 35,000. If the number average molecular weight of the above resin (A) is less than 1,000, the coating efficiency of cationic electrodeposition coating will become poor and, if it exceeds 35,000, it will become difficult to form good coats on the surface of the article to be coated.

The above resin (A) preferably has a glass transition temperature of −80 to 150° C. Resins having the above glass transition temperature below −80° C. are practically difficult to prepare. If the glass transition temperature exceeds 150° C., the flexibility will be low and the chipping resistance may possibly be deteriorated. The range of −70 to 100° C. is more preferred and the range of −50 to 80° C. is still more preferred.

The above resin (A) preferably has a hydroxyl value of 2 to 120 mg KOH/g. If the above hydroxyl value is less than 2 mg KOH/g, the compatibility with resin (B) will be lacked and the curability may decrease in some instances. At a value exceeding 120 mg KOH/g, the hydrophilicity will become excessive, lowering the waterproof property of coating films, and corrosion resistance and rust prevention may be unsatisfactory in some cases. The range of 2 to 110 mg KOH/g is preferred and the range of 2 to 95 mg KOH/g is more preferred.

The content of the above resin (A) is preferably 5 to 80% by weight relative to the total resin solid matter of the above resin (A) and the above resin (B). When the content of the above resin (A) is less than 5% by weight based on the above total resin solid matter, the effects of the resin composition of the invention, such as impact resistance, chipping resistance and so forth, may not be sufficiently manifested in some cases and, if it exceeds 80% by weight, the above resins (A) and (B) may possibly undergo phase separation, so that the coating emulsion becomes unstable in some cases. The content of the above resin (A) relative to the above-mentioned total resin solid matter is more preferably 5 to 40% by weight.

The above resin (B) serves as a shell component in the resin composition of the present invention.

The above resin (B) has a sulfonium group and a propargyl group within the molecule thereof. The above sulfonium group is a hydratable functional group in resin (B) and shows an excellent throwing power in electrodeposition coating. The above propargyl group contributes to reactivity.

The above resin (B) preferably comprises a resin having an epoxy resin skeleton. The above epoxy resin is not particularly restricted but includes, for example, epibisepoxy resins and modifications thereof by chain extension with a diol, dicarboxylic acid, diamine or the like; epoxidized polybutadiene; novolak phenol-based polyepoxy resins; novolak cresol-based polyepoxy resins; polyglycidyl acrylate; polyglycidyl ethers derived from aliphatic polyols or polyether polyols; and polyglycidyl esters of polybasic carboxylic acids. Among them, novolak phenol-based polyepoxy resins, novolak cresol-based polyepoxy resins and polyglycidyl acrylate are preferred because they are easy to be polyfunctionalized for increasing the curability. The above polyepoxy resins may partly comprise a monoepoxy resin.

The above resin (B) preferably has a number average molecular weight of 500 to 20,000. If the number average molecular weight is less than 500, the coating efficiency of cationic electrodeposition coating will become poor and, if it exceeds 20,000, it will be no longer possible to form good coats on the surface of the article to be coated. It is possible to select a more preferred number average molecular weight according to the resin skeleton. In the case of a novolak phenol-based epoxy resin or novolak cresol-based epoxy resin, for example, the molecular weight of 700 to 5,000 is more preferred.

The above sulfonium group and propargyl group can be introduced into the molecule of the above resin (B), for example via an epoxy group of the above epoxy resins.

The above resin (B) may further have an unsaturated double bond within the molecule. The above unsaturated double bond can also be introduced into the molecule of the above resin (B) via the epoxy group mentioned above, for instance.

The above resin (B) may contain all the three of the sulfonium group and propargyl group and unsaturated double bond within each molecule. This is, however, not always necessary. Thus, for example, each molecule may contain one or two of the sulfonium group, propargyl group and unsaturated double bond. In the latter case, the resin molecule constituting the above resin (B), as a whole, contains both the sulfonium group and propargyl group and, as the case may be, contains the unsaturated double bond as well. Thus, the above resin composition for use in an electrodeposition coating may generally comprise a plurality of resin molecules having an epoxy resin skeleton and having one, two, three or more of sulfonium group, propargyl group and unsaturated double bond. The above resin (B) so referred to herein contains the sulfonium group, propargyl group and, optionally, an unsaturated double bond in the above sense.

Therefore, the above skeleton-forming epoxy resin may partly be one having at least one epoxy group within each molecule. From the viewpoint of curability, however, a polyepoxy resin having at least two epoxy groups within each molecule is preferred. As such resins, those polyepoxy resins specifically mentioned above and the like are preferably used.

The above sulfonium group is a hydratable functional group in the above resin (B). When given a voltage or current not less than a certain level in the process of electrodeposition coating, the sulfonium group can be irreversibly converted to a nonconductor as a result of disappearance of the ionic groups by electrolytic reduction reaction on the electrode, as shown below. It is presumably owing to this fact that the above resin (B) can show a high level of throwing power.

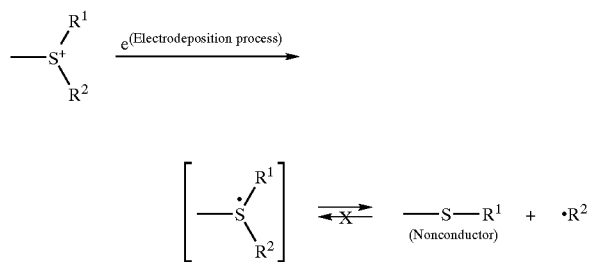

The content of the above sulfonium group is preferably 5 to 400 mmol per 100 g of the solid matter in the above resin (B) provided that the conditions concerning the sulfonium group, propargyl group and unsaturated double bond contents, which are to be mentioned later herein, are satisfied. If it is less than 5 mmol/100 g, it is difficult to manifest sufficient throwing power or curability, and, further, the hydratability and bath stability will possibly become poor. If it exceeds 400 mmol/100 g, the deposition of a coat on the surface of the article to be coated may become poor in some cases. It is possible to select a more preferred content according to the resin skeleton. In the case of a novolak phenol-based epoxy resin or novolak cresol-based epoxy resin, for example, the content is preferably 5 to 250 mmol, more preferably 10 to 150 mmol, per 100 grams of the solid matter of the resin composition.

The above propargyl group can constitute a curing system without generating any leaving substance. For yet unknown reasons, it can further improve the throwing power of the resin composition when it occurs together with a sulfonium group.

The content of the above propargyl group is preferably 10 to 485 mmol per 100 g of the solid matter in the above resin (B) provided that the conditions concerning the sulfonium group, propargyl group and unsaturated double bond contents, which are to be mentioned later herein, are satisfied. When it is less than 10 mmol/100 g, it becomes difficult to manifest a sufficient throwing power or curability and, if it exceeds 485 mmol/100 g, the hydration stability may adversely be affected when it is used as a cationic electrodeposition coating. A preferred content can be selected according to the resin skeleton and, in the case of a novolak phenol-based epoxy resin or novolak cresol-based epoxy resin, for instance, a content of 20 to 375 mmol per 100 g of the solid matter in the resin composition is preferred.

The above-mentioned unsaturated double bond so referred to herein means a carbon-carbon double bond. The unsaturated double bond is highly reactive and, therefore, can further improve the curability.

The above unsaturated double bond content is preferably 10 to 485 mmol per 100 g of the solid matter in the above resin (B) provided that the conditions concerning the sulfonium group, propargyl group and unsaturated double bond contents, which are to be mentioned later herein, are satisfied. If it is less than 10 mmol/100 g, it becomes difficult to manifest a sufficient curability and, if it exceeds 485 mmol/100 g, the hydration stability may adversely be affected when it is used as a cationic electrodeposition coating. A more preferred content can be selected according to the resin skeleton and, in the case of a novolak phenol-based epoxy resin or novolak cresol-based epoxy resin, for instance, a content of 20 to 375 mmol per 100 g of the solid matter in the resin composition is preferred.

The above unsaturated double bond content so referred to herein is expressed in terms of the amount corresponding to the content of the epoxy group into which the above unsaturated double bond has been introduced. Thus, even when a molecule having a plurality of unsaturated double bonds within the molecule, such as a long-chain unsaturated fatty acid, has been introduced into the epoxy group, the unsaturated double bond content is expressed in terms of the content of the epoxy group into which the above-mentioned molecule having a plurality of unsaturated double bonds has been introduced. This is because even when a molecule having a plurality of unsaturated double bonds within the molecule is introduced in one epoxy group, it is only one of the unsaturated double bonds that is thought to be substantially involved in the curing reaction.

The total content of the above sulfonium group and the above propargyl group is preferably 15 to 500 mmol per 100 g of the solid matter in the resin composition. If it is less than 15 mmol/100 g, the hydration stability may adversely be affected or any sufficient throwing power may not be obtained in some instances when it is used as a cationic electrodeposition coating. If it exceeds 500 mmol/100 g, the deposition of a coat on the surface of the article to be coated may become poor or any sufficient throwing power may not be obtained. A more preferred content can be selected according to the resin skeleton and, in the case of a novolak phenol-based epoxy resin or a novolak cresol-based epoxy resin, for instance, a content of 20 to 400 mmol per 100 g of the solid matter in the resin composition is more preferred.

In cases where the above resin (B) contains the above-mentioned unsaturated double bond, the total content of the above sulfonium group, the above propargyl group and the above unsaturated double bond is preferably not more than 500 mmol per 100 g of the solid matter in the resin composition. If it exceeds 500 mmol/100 g, no resin will practically be obtained or no desired performance characteristics may be obtained. A more preferred content can be selected according to the resin skeleton and, in the case of a novolak phenol-based epoxy resin or a novolak cresol-based epoxy resin, for instance, a content not more than 400 mmol per 100 g of the solid matter in the resin composition is more preferred.

In cases where the above resin (B) contains the above-mentioned unsaturated double bond, the total content of the above propargyl group and the above unsaturated double bond is preferably within the range of 80 to 450 mmol per 100 g of the solid matter in the resin composition. If it is less than 80 mmol/100 g, the curability may possibly be insufficient and, if it exceeds 450 mmol/100 g, the sulfonium group content decreases, hence the throwing power may possibly become insufficient. A more preferred content can be selected according to the resin skeleton and, in the case of a novolak phenol-based epoxy resin or a novolak cresol-based epoxy resin, for instance, a content of 100 to 395 mmol per 100 g of the solid matter in the resin composition is more preferred.

A curing catalyst may be introduced into the above resin (B). When a curing catalyst capable of forming an acetylide with a propargyl group is used, for instance, it is possible to introduce the curing catalyst into the resin by converting part of the propargyl group into an acetylide.

The above resin (B) can preferably be produced, for example, by the step (1) of reacting an epoxy resin having at least two epoxy groups within each molecule with a compound (a) having both a functional group capable of reacting with the epoxy group and a propargyl group to give a propargyl group-containing epoxy resin composition and by the step (2) of introducing a sulfonium group into the remaining epoxy group in the epoxy resin composition containing a propargyl group obtained in the step (1).

In cases where the above resin (B) contains the above-mentioned unsaturated double bond, the double bond can be introduced into the molecule of the above resin (B) by reacting, in the above step (1), the above epoxy resin further with a compound (b) having both a functional group capable of reacting with the epoxy group and an unsaturated double bond.

Preferably used as the above-mentioned epoxy resin having at least two epoxy groups within each molecule are those polyepoxy resins mentioned above and the like. Among these, novolak phenol-based polyepoxy resins, novolak cresol-based epoxy resins and polyglycidyl acrylate are preferred because they can be easily polyfunctionalized for improving curability.

The above-mentioned epoxy resin having at least two epoxy groups within each molecule preferably has a number average molecular weight of 400 to 15,000, more preferably 650 to 12,000.

The above-mentioned compound (a) having both a functional group capable of reacting with the epoxy group and a propargyl group (hereinafter referred to as "compound (a)") may be, for example, a compound having both a functional group capable of reacting with the epoxy group, such as a hydroxyl group or carboxyl group, and a propargyl group and specifically includes propargyl alcohol, propargylic acid and the like. Among these, propargyl alcohol is preferred because of its easy availability and reactivity.

The above-mentioned compound (b) having both a functional group capable of reacting with the epoxy group and an unsaturated double bond (hereinafter referred to as "compound (b)") may be a compound having both a functional group capable of reacting with the epoxy group, such as a hydroxyl group or carboxyl group, and an unsaturated double bond. When the group reacting with the epoxy group is a hydroxyl group, there may be mentioned, for example, those hydroxyl group-containing radical-polymerizable monomers specifically mentioned hereinabove as constituents of the acrylic polyols. In cases where the group reacting with the epoxy group is a carboxyl group, there may be mentioned acrylic acid, methacrylic acid, ethacrylic acid, crotonic acid, maleic acid, phthalic acid, itaconic acid; half esters such as monoethyl maleate, monoethyl fumarate, monoethyl itaconate, mono(meth)acryloyloxyethyl succinate, mono(meth)acryloyloxyethyl phthalate; synthetic unsaturated fatty acids such as oleic acid, linolic acid and ricinolic acid; natural unsaturated fatty acids such as linseed oil fatty acids and soybean oil fatty acids; and the like.

In cases where the above resin (B) contains the above-mentioned unsaturated double bond, in the above-mentioned step (1), the above compounds (a) and (b) may be mixed together beforehand and subjected to the reaction or the above compounds (a) and (b) may be subjected to the reaction separately. The above functional group capable of reacting with the epoxy group contained in compound (a) may be the same as or different from the above functional group capable of reacting with the epoxy group contained in compound (b).

The proportions of the above compounds (a) and (b) in the above step (1) may be selected so as to give desired functional group contents, for example the above-mentioned propargyl group and unsaturated double bond contents. As for the reaction conditions, the reaction is generally carried out at room temperature or 80 to 140° C. for several hours. If necessary, a known ingredient(s) necessary for promoting the reaction, for example a catalyst and/or solvent, may be used. The completion of the reaction can be confirmed by determining the epoxy group equivalent, and the functional group(s) introduced can be confirmed by nonvolatile matter content determination or instrumental analysis of the resin composition obtained. The thus-obtained reaction product generally occurs as a mixture of epoxy resins having one or a plurality of propargyl groups and unsaturated double bonds. A resin composition containing a propargyl group and an unsaturated double bond in this sense is obtained in the step (1).

In the above step (2), a sulfonium group is introduced into the remaining epoxy group in the epoxy resin composition containing a propargyl group, optionally together with an unsaturated double bond obtained in the above step (1). The sulfonium group introduction can be carried out, for example, by the method comprising reacting a sulfide/acid mixture with the epoxy group to thereby introduce a sulfide as well as to effect sulfonium formation, or by the method comprising introducing a sulfide and then, further converting the sulfide introduced to a sulfonium with an acid or an alkyl halide or the like, if necessary followed by anion exchange. From the viewpoint of easy availability of starting reactants, the method using a sulfide/acid mixture is preferred.

The above sulfide is not particularly restricted but includes, for example, aliphatic sulfides, aliphatic-aromatic mixed sulfides, aralkyl sulfides and cyclic sulfides. More specifically, there may be mentioned, for example, diethyl sulfide, dipropyl sulfide, dibutyl sulfide, dihexyl sulfide, diphenyl sulfide, ethyl phenyl sulfide, tetramethylene sulfide, pentamethylene sulfide, thiodiethanol, thiodipropanol, thiodibutanol, 1-(2-hydroxyethylthio)-2-propanol, 1-(2-hydroxyethylthio)-2-butanol and 1-(2-hydroxyethylthio)-3-butoxy-1-propanol.

The acid mentioned above is not particularly restricted but includes, for example, formic acid, acetic acid, lactic acid, propionic acid, boric acid, butyric acid, dimethylolpropionic acid, hydrochloric acid, sulfuric acid, phosphoric acid, N-acetylglycine and N-acetyl-β-alanine.

A generally preferred mixing ratio between the above sulfide and the above acid in the above sulfide/acid mixture is sulfide/acid=about 100/60 to 100/100 in mole ratio.

The alkyl halide mentioned above is not particularly restricted but includes, for example, methyl fluoride, methyl chloride, methyl bromide, methyl iodide, ethyl iodide, propyl iodide and isopropyl iodide.

The above reaction in step (2) can be carried out, for example, by blending the epoxy resin composition containing a propargyl group and optionally an unsaturated double bond obtained in the above step (1) and, for example, the mixture of the above sulfide and the above acid in which the sulfide is in determined amount sufficient to give a sulfonium group content mentioned above with water in an amount of 5 to 10 moles per mole of the sulfide employed, and stirring the resulting mixture generally at 50 to 90° C. for several hours. The endpoint of the reaction may be indicated by a residual acid value of not more than 5. The sulfonium group introduction in the resin composition obtained can be confirmed by potentiometric titration.

The reaction for converting a sulfide introduced to a sulfonium can be carried out according to the manner as mentioned above.

According to a typical production method of the above resin (B), the production can preferably be carried out, for example, by the step (3) of reacting an epoxy resin having at least two epoxy groups within each molecule with a compound having a propargyl group and a hydroxyl group to give a epoxy resin composition containing a propargyl group and the step (4) of reacting the remaining epoxy group in the epoxy resin composition containing a propargyl group obtained in the above step (3) with an acid/sulfide mixture to introduce a sulfonium group.

When the above resin (B) has the above-mentioned unsaturated double bond, a step (5) of reacting a compound having an unsaturated double bond and a carboxyl group with the remaining epoxy group in the epoxy resin composition containing a propargyl group obtained in the above step (3) to thereby obtain an epoxy resin composition containing a propargyl group and an unsaturated double bond can be carried out prior to the above step (4).

When, in the production method of the above resin (B), the sulfonium group introduction is carried out after propargyl group introduction and optional unsaturated double bond introduction, as mentioned above, the sulfonium group degradation due to heating can be prevented.

The method of preparing the resin composition of the present invention is not particularly restricted but, for example, the method may be employed which comprises mixing the above resin (A) with the above resin (B) at room temperature to 100° C., preferably 30 to 60° C., more preferably 40 to 50° C., for 30 minutes to 2 hours, then adding an additive(s) according to need, and emulsifying in a high-speed rotary mixer.

The present invention is also directed to a cationic electrodeposition coating composition containing the above resin composition. In the cationic electrodeposition coating composition of the present invention, the above resin composition can be used in combination with another resin.

The above cationic electrodeposition coating composition can widely be used in cationic deposition coating in general. Since it is excellent in impact resistance, chipping resistance and corrosion prevention, for example, it can preferably be used in undercoat coating of car bodies and the like.

The above cationic electrodeposition coating composition can be further improved with respect to oil repellency, corrosion prevention, curability, workability, adhesiveness, throwing power and so forth, by appropriately adjusting the constituent species and the contents thereof in the above resin (A) and/or the proportion between the above resin (A) and the above resin (B) and, therefore, it can also be used for various coatings where those performance characteristics are required, for example, in an intermediate coating in car body coating.

It is not always necessary to use a curing agent in the cationic electrodeposition coating composition of the present invention, since the resin composition mentioned above itself has curability. However, for further improving the curability, such may be used. As such curing agent, there may be mentioned, for example, compounds having a plurality of at least one of propargyl groups and unsaturated double bonds, for example compounds obtained by subjecting a propargyl group-containing compound, such as propargyl alcohol, or an unsaturated double bond-containing compound, such as acrylic acid, to addition reaction to a polyepoxide such as novolak phenol or pentaerythritol tetraglycidyl ether.

In the cationic electrodeposition coating composition of the present invention, there may be used a curing catalyst for promoting the curing reaction between unsaturated bonds. Such curing catalyst is not particularly restricted but includes, for example, acetates or acetylacetonate complexes of copper, cerium, aluminum, tin, manganese, zinc, cobalt, nickel, etc.

Among them, the copper acetylacetone complex and copper acetate are preferred. The level of addition of the above curing catalyst is preferably 0.1 to 20 mmol per 100 g of the resin solid matter in the above cationic electrodeposition coating composition.

An amine may also be incorporated in the cationic electrodeposition coating composition of the present invention. By the addition of the above amine, the conversion efficiency of the sulfonium group to a sulfide by electrolytic reduction in the process of electrodeposition is increased. The above amine is not particularly restricted but includes, for example, amine compounds such as primary to tertiary monofunctional or polyfunctional aliphatic amines, alicyclic amines and aromatic amines. Among these, water-soluble or water-dispersible ones are preferred and, thus, mention may be made of, for example, alkylamines of 2 to 8 carbon atoms such as monomethylamine, dimethylamine, trimethylamine, triethylamine, propylamine, diisopropylamine and tributylamine; monoethanolamine, dimethanolamine, methylethanolamine, methyldiethanolamine, dimethylethanolamine, cyclohexylamine, morpholine, N-methylmorpholine, pyridine, pyrazine, piperidine, imidazoline, imidazole and the like. These may be used singly or two or more of them may be used in combination. Among them, hydroxy amines such as monoethanolamine, diethanolamine and dimethylethanolamine are preferred because of their excellent dispersion stability in water.

The above amine can be directly incorporated in the cationic electrodeposition coating composition of the invention. While, in the conventional neutralized type amine-containing cationic electrodeposition coating compositions, the addition of a free amine results in deprivation of the neutralizing acid in the resin, hence in marked deterioration of the stability of the electrodeposition solution, no such bath stability inhibition will arise in the practice of the invention.

The level of addition of the above amine is preferably 0.3 to 25 meq per 100 g of the resin solid matter in the above cationic electrodeposition coating composition. If it is less than 0.3 meq/100 g, no sufficient effects can be obtained on the throwing power. If it exceeds 25 meq/100 g, the effects proportional to the addition level can no longer be obtained, thus, this is not economical. A more preferred range is 1 to 15 meq/100 g.

The cationic electrodeposition coating composition of the invention may contain, according to need, other components used in cationic electrodeposition coating compositions in general. The above-mentioned other components are not particularly restricted but include, for example, pigments, pigment dispersing resins, surfactants, antioxidants, polymerization inhibitors, ultraviolet absorbers and like additives used in coatings.

The above-mentioned pigments are not particularly restricted but include, for example, color pigments such as titanium dioxide, carbon black and red iron oxide; rust-preventive pigments such as basic lead silicate and aluminum phosphomolybdate; extender pigments such as kaolin, clay and talc; and like pigments used in cationic electrodeposition coating compositions in general.

The level of addition of the above pigments is preferably 0 to 50% by weight on the solid matter basis in the above cationic electrodeposition coating composition.

The pigment dispersing resins mentioned above are not particularly restricted but include those pigment dispersing resins which are in general use. A pigment dispersing resin containing a sulfonium group and an unsaturated bond therein may also be used. Such pigment dispersing resin containing a sulfonium group and an unsaturated bond can be obtained, for example, by reacting a hydrophobic epoxy resin, which is obtainable by reacting a bisphenol-based epoxy resin with a half-blocked isocyanate, with a sulfide compound or by reacting the above resin with a sulfide compound in the presence of a monobasic acid and a hydroxyl group-containing dibasic acid.

The cationic electrodeposition coating composition of the present invention can be obtained by admixing the above resin composition with respective components mentioned above if necessary, and dissolving or dispersing the mixture in water. When it is used in cationic electrodeposition coating, it is preferably prepared to give a bath liquid with a nonvolatile matter content of 10 to 30%. Further, it is preferably prepared in a manner such that the propargyl group, unsaturated double bond and sulfonium group contents in the above cationic electrodeposition coating composition be not out of the content ranges mentioned hereinabove referring to the above resin composition.

In carrying out electrodeposition coating using the cationic electrodeposition coating composition of the invention, the article to be coated is not particularly restricted but may be any of those having electric conductivity, for example, iron, steel or aluminum panels, surface-treated modifications of these, shaped articles made thereof and the like.

The electrodeposition coating is generally carried out by applying a voltage of about 50 to 450 V between the anode and the article to be coated to serve as a cathode. If the applied voltage is less than 50 V, insufficient electrodeposition will result. If it exceeds 450 V, the power consumption will increase and it is not economical. By using the composition according to the invention and applying a voltage within the above range, a uniform coat can be formed on the whole article to be coated without causing any steep film thickness increase during the process of electrodeposition.

In applying the above voltage, the bath liquid temperature of the cationic electrodeposition coating composition is generally and preferably 10 to 45° C.

The process of electrodeposition is preferably constituted by (i) the step of immersing the article to be coated in the cationic electrodeposition coating composition, (ii) the step of applying a voltage between the anode and the article to be coated to serve as a cathode to thereby cause a coat to deposit and (iii) the step of further applying a voltage to the above deposited coat to thereby increase the electric resistance value per unit volume of the above coat. The time of voltage application may vary depending on the electrodeposition conditions. Generally, it may be 2 to 4 minutes.

The electrodeposited coat obtained in the above manner, either as it is after completion of the electrodeposition process or after washing with water, is cured by baking at 120 to 260° C., preferably 160 to 220° C., for 10 to 30 minutes, to finish the coating process.

When the cationic electrodeposition coating composition of the present invention is used, the electrodeposited coating films after curing preferably have a film thickness of 10 to 25 μm. If it is less than 10 μm, the rust prevention will be insufficient. If it exceeds 25 μm, it leads to waste of the coating. When the cationic electrodeposition coating composition of the invention is used, the coat deposited on the surface of the article to be coated by electrodeposition is converted to a nonconductor by the electrolytic reduction reaction mentioned above and, as a result, the throwing power is markedly improved. Therefore, even when the film thickness of the coating films is within the above range, a uniform coating film can be formed all over the article to be coated and sufficient rust prevention can be manifested.

The article on which thus-obtained coating film is formed is further subjected to intermediate coating and/or top coating as required according to the purpose. In the case of automotive outer panels, for instance, after applying a solvent-borne, water-borne or powder intermediate coating for enhancing the chipping resistance and baking, further, the so-called two-coat one-bake coating technique can generally be applied which comprises applying a base coating and then, without curing the same, applying a clear coating by the so-called wet-on-wet technique and baking these resulting coating films simultaneously. On that occasion, considering the possible environmental problems, using a water-borne coating as the above base coating and a powder coating as the above clear coating is preferred. It is also possible to employ a solid-based coating to which the one-coat coating technique is to be applied.

The resin composition of the invention, which is constituted as mentioned above, shows a high level of curability, shows a desired level of throwing power and corrosion prevention and can give coating films excellent in flexibility such as impact resistance, chipping resistance and so forth. Further, the water resistance, corrosion prevention, curability, oil repellency, workability, adhesiveness and other characteristics can be further improved by appropriately adjusting the constituent resin species and/or contents thereof within the scope of the invention, so that it makes it widely possible to carry out coating according to the purpose and thus, for example, it can preferably be used in cationic electrodeposition coatings.

The cationic electrodeposition coating composition of the invention comprises the above resin composition of the invention, so that it can manifest the characteristics of the above resin composition. Thus, by appropriately adjusting the resin composition of the invention, the coating composition can be used widely for industrial coating purposes, typically in cases where high levels of impact resistance and corrosion prevention are required, for example in undercoat coating of car bodies.

BEST MODE FOR CARRYING OUT THE INVENTION

The following examples illustrate the present invention in more detail. They are, however, by no means limitative of the scope of the present invention.

Preparation of a Shell-forming Resin

PREPARATION EXAMPLE 1

Production of a resin composition for use in cationic electrodeposition coating containing a sulfonium group, propargyl group and long chain unsaturated fatty acid residue To 3,082.5 g of a cresol novolak-based epoxy resin with an epoxy equivalent of 201.8 (trademark: Epo Tohto YDCM-703, product of Tohto Kasei) placed in a separable flask equipped with a stirrer, thermometer, nitrogen inlet tube and condenser were added 621.3 g of propargyl alcohol, 535.4 g of linseed oil fatty acids and 9.2 g of dimethylbenzylamine as a catalyst, and the mixture was heated to 110° C. and the reaction was allowed to proceed for 2 hours. When the epoxy equivalent amounted to 1,850, 311.6 g of 1-(2-hydroxyethylthio)-2-propanol, 110 g of glacial acetic acid and 329.9 g of deionized water were added and the reaction was allowed to proceed at 75° C. for 6 hours. After confirming that the residual acid value was less than 5, 1,501.2 g of deionized water was added to give the desired resin composition solution. This was used in Examples 1 to 22 and Comparative Examples 1 and 2, which are to be described herein below.

Preparation of Core-forming Resins

PREPARATION EXAMPLE 2

Polybutadienedicarboxylic acid (trademark: NISSO PB-C1000; product of Nippon Soda; 660 g) and 60 g of 2-butyne-1,4-diol (product of BASF) were dissolved in 145 g of xylene, and 0.7 g of p-toluenesulfonic acid was added. The condensation was allowed to proceed for 7 hours while dehydrating under reflux at 150° C.

After formation of the theoretical amount of water, the solvent was removed under reduced pressure to give a polyester polyol resin with a number average molecular weight of 6,070, a glass transition temperature of −21.1° C. and a hydroxyl value of 18.5. This was used in Examples 1 to 6 as described herein below.

PREPARATION EXAMPLE 3

Unsaturated aliphatic dicarboxylic acid (trademark: Versadyme 216; product of Henkel-Hakusui; 100 g) and 23 g of 2-butyne-1,4-diol (product of BASF) were dissolved in 25 g of xylene, and 0.1 g of p-toluenesulfonic acid was added. The condensation was allowed to proceed for 8 hours while dehydrating under reflux at 100 to 180° C.

After formation of the theoretical amount of water, the solvent was removed under reduced pressure to give a polyester polyol resin with a number average molecular weight of 3,500, a glass transition temperature of −10.1° C. and a hydroxyl value of 32.0. This was used in Example 7 as described herein below.

PREPARATION EXAMPLE 4

Hydrogenated bisphenol A diglycidyl ether (product of Tohto Kasei; 54 g) and 150 g of polybutadienedicarboxylic acid (trademark: NISSO PB-C1000; product of Nippon Soda) were mixed together without adding any catalyst, 0.16 g of ethyltriphenylphosphonium iodide (ETPPI) was then admixed, as a catalyst, and the resulting mixture was heated at 100° C. with stirring for 10 hours. Then, a polyester polyol resin with a number average molecular weight of 4,000, an acid value of 1.0, a glass transition temperature of −12.5° C. and a hydroxyl value of 28.0 was obtained. This was used in Example 8 as described herein below.

PREPARATION EXAMPLE 5

Polybutadienedicarboxylic acid (trademark: NISSO PB-C1000; product of Nippon Soda; 200 g) and 32 g of phenyl glycidyl ether were mixed together and heated to 80° C., then 0.6 g of dimethylbenzylamine, as a catalyst, was added slowly and, thereafter, the mixture was heated at 90° C. to 120° C. with stirring for 5 hours to give a polyester polyol resin with a number average molecular weight of 1,600, a glass transition temperature of −25.0° C. and a hydroxyl value of 70.0. This was used in Examples 9 and 10, as described herein below.

PREPARATION EXAMPLE 6

Polybutadienedicarboxylic acid (trademark: NISSO PB-C1000; product of Nippon Soda; 600 g) and 160 g of bisphenol F (trademark: YDF 170; product of Tohto Kasei) were mixed together, 2.7 g of ethyltriphenylphosphonium iodide (ETPPI) was added as a catalyst, and the resulting mixture was heated at 100° C. with stirring for 5 hours. Linseed oil fatty acids (88 g) was added and the resulting mixture was heated at 100 to 140° C. with stirring for 8 hours, whereby a polyester polyol resin with a number average molecular weight of 6,400, a glass transition temperature of 5.0° C. and a hydroxyl value of 70.0 was obtained. This was used in Example 11 as described herein below.

PREPARATION EXAMPLE 7

Adipic acid (194 g) and 152 g of 2-butyne-1,4-diol (product of BASF) were dissolved in 200 g of toluene, and 0.1 g of p-toluenesulfonic acid was added. The condensation was allowed to proceed for 8 hours while dehydrating under reflux at 100 to 180° C.

After formation of the theoretical amount of water, the solvent was removed under reduced pressure to give a polyester polyol resin with a number average molecular weight of 1,322, a glass transition temperature of 0.5° C. and a hydroxyl value of 85.0. This was used in Example 12 as described herein below.

PREPARATION EXAMPLE 8

Higher dicarboxylic acids (trademark: IPU 22; product of Okamura Seiyu; 95.2 g) and 33.5 g of 2-butyne-1,4-diol (product of BASF) were dissolved in 200 g of methyl isobutyl ketone, and 0.3 g of p-toluenesulfonic acid was added. The condensation reaction was allowed to proceed for 3 hours while dehydrating under reflux at 100 to 130° C.

After formation of the theoretical amount of water, the solvent was removed under reduced pressure to give a polyester polyol resin with a number average molecular weight of 1,322, a glass transition temperature of 8.0° C. and a hydroxyl value of 85.0. This was used in Example 13 as described herein below.

PREPARATION EXAMPLE 9

Polybutadienedicarboxylic acid (trademark: NISSO PB-C1000; product of Nippon Soda; 660 g) and 72 g of neopentyl glycol were dissolved in 145 g of methyl isobutyl ketone, and 0.7 g of p-toluenesulfonic acid was added. The condensation was allowed to proceed for 7 hours while dehydrating under reflux at 150° C.

After formation of the theoretical amount of water, the solvent was removed under reduced pressure to give a polyester polyol resin with a number average molecular weight of 7,070, a glass transition temperature of −28.0° C. and a hydroxyl value of 15.0. This was used in Example 14 as described herein below.

PREPARATION EXAMPLE 10

Polybutadienedicarboxylic acid (trademark: NISSO PB-C1000; product of Nippon Soda; 547 g) and 142 g of hydrogenated bisphenol A (trademark: Rikabinol HB; product of New Japan Chemical) were dissolved in 109 g of methyl isobutyl ketone, and 0.54 g of p-toluenesulfonic acid and 0.34 g of methoquinone were added. The condensation was allowed to proceed for 8 hours while dehydrating under reflux at 100 to 160° C.

After formation of the theoretical amount of water, the solvent was removed under reduced pressure to give a polyester polyol resin with a number average molecular weight of 4,200, a glass transition temperature of −15.5° C. and a hydroxyl value of 26.0. This was used in Example 15 as described herein below.

PREPARATION EXAMPLE 11

Polybutadienedicarboxylic acid (trademark: NISSO PB-C1000; product of Nippon Soda; 580 g), 75.6 g of hydrogenated bisphenol A (trademark: Rikabinol HB; product of New Japan Chemical) and 26 g of 2-butyne-1,4-diol (product of BASF) were dissolved in 116 g of methyl isobutyl ketone, and 0.58 g of p-toluenesulfonic acid and 0.34 g of methoquinone were added. The condensation was allowed to proceed for 8 hours while dehydrating under reflux at 100 to 160° C.

After formation of the theoretical amount of water, the solvent was removed under reduced pressure to give a polyester polyol resin with a number average molecular weight of 4,900, a glass transition temperature of −14.0° C. and a hydroxyl value of 22.0. This was used in Example 16 as described herein below.

PREPARATION EXAMPLE 12

Polybutadienediol (trademark: NISSO PB-G2000; product of Nippon Soda; 200 g) and 11.6 g of diphenylmethanediisocyanate (MDI) were dissolved in 24 g of dehydrated methyl isobutyl ketone, and the solution was heated and stirred at 60 to 70° C. for 4.5 hours, whereby a polyurethane polyol resin with a number average molecular weight of 7,000, a glass transition temperature of 10.0° C. and a hydroxyl value of 16.0 was obtained. This was used in Example 17 as described herein below.

PREPARATION EXAMPLE 13

Polybutadienediol (trademark: NISSO PB-G2000; product of Nippon Soda; 200 g) and 23.7 g of diphenylmethanediisocyanate (MDI) were dissolved in 76 g of dehydrated methyl isobutyl ketone, and the solution was heated with stirring at 100° C. for 7 hours, whereby a polyurethane polyol resin with a number average molecular weight of 31,000, a glass transition temperature of 10.0° C. and a hydroxyl value of 3.6 was obtained. This was used in Example 18 as described herein below.

PREPARATION EXAMPLE 14

The polyester resin (160 g) obtained in Preparation Example 1 and 2.3 g of diphenylmethanediisocyanate (MDI) were dissolved in 30 g of xylene, and the solution was heated at 75° C. with stirring for 2.5 hours and, then, the solvent was removed under reduced pressure to give a polyurethane polyol resin with a number average molecular weight of 9,400, a glass transition temperature of 3.0° C. and a hydroxyl value of 3.0. This was used in Example 19 as described herein below.

PREPARATION EXAMPLE 15

Polybutadienediol (trademark: NISSO PB-G2000; product of Nippon Soda; number average molecular weight 1,930, glass transition temperature −21.0° C., hydroxyl value 58.0) was prepared and used in Example 20 as described herein below.

PREPARATION EXAMPLE 16

Polybutadienepolycarboxylic acid (trademark: NISSO PB-C1000; product of Nippon Soda; 100 g) and 104 g of a polycarbonate resin (trademark: CD 210; product of Daicel Chemical Industries) were dissolved in 145 g of methyl isobutyl ketone, and 0.7 g of p-toluenesulfonic acid was added. The condensation was allowed to proceed for 7 hours while dehydrating under reflux at 150° C. After formation of the theoretical amount of water, the solvent was removed under reduced pressure to give a polycarbonate polyol resin with a number average molecular weight of 4,300, a glass transition temperature of 10.0° C. and a hydroxyl value of 93.0. This was used in Example 21 as described herein below.

PREPARATION EXAMPLE 17

Polybutadienepolycarboxylic acid (trademark: NISSO PB-C1000; product of Nippon Soda; 100 g) and 18 g of triethylene glycol were dissolved in 145 g of methyl isobutyl ketone, and 0.7 g of p-toluenesulfonic acid was added. The condensation was allowed to proceed for 7 hours while dehydrating under reflux at 150° C. After formation of the theoretical amount of water, the solvent was removed under reduced pressure to give a polyether polyol resin with a number average molecular weight of 4,800, a glass transition temperature of −15.0° C. and a hydroxyl value of 26.0. This was used in Example 22 as described herein below.

PREPARATION EXAMPLE 18

Polybutadienepolycarboxylic acid (trademark: NISSO PB-C1000; product of Nippon Soda; 708.6 g) and 99.7 g of dipropylene glycol were dissolved in 130 g of methyl isobutyl ketone, and 0.7 g of p-toluenesulfonic acid was added. The condensation was allowed to proceed for 8 hours while dehydrating under reflux at 100 to 160° C. After formation of the theoretical amount of water, the solvent was removed under reduced pressure to give a polyester polyol resin with a number average molecular weight of 5,600, a glass transition temperature of −10° C. and a hydroxyl value of 20. This was used in Example 23 as described herein below.

Preparation of Resin Compositions and Cationic Electrodeposition Coating Compositions

EXAMPLES 1 to 23

Each of the core resins and the shell resins obtained in the above manner were mixed together, aluminum-acetylacetonate complex was added as a catalyst in an amount of 0.3% by weight based on 100% by weight of the total resin solid matter, and the whole was stirred for emulsification in a high-speed rotary mixer for 1 hour, to give a resin composition. The weight percentage of the core resin solid matter relative to the total amount of the core resin and shell resin solid matters was as shown in Table 1, namely the above core resin and the above shell resin were added to give the amount given in Table 1. The resulting resin composition had a resin solid matter of 20% by weight.

To each resin composition obtained were added, as catalysts, 0.3% by weight of cerium acetate and 0.2% by weight of copper acetate based on 100% by weight of the resin solid matter. Further, when so indicated in Table 1, N-methylethanolamine was added as an amine in an amount of 8 meq per 100 g of the solid matter in the cationic electrodeposition coating composition. The resulting mixture was stirred at 30° C. for 1 hour using a high-speed rotary mixer to give a cationic electrodeposition coating composition.

COMPARATIVE EXAMPLES 1 AND 2

Resin compositions and cationic electrodeposition coating compositions were obtained in the same manner as in the above Examples except that no core resin was used.

Preparation of Coating Films for Evaluation

A steel panel (JIS G 3141 SPCC-SD, treated with Nippon Paint's Surfdyne SD-5000) was used as the cathode and a stainless steel vessel as the anode, and electrodeposition coating was carried out at a predetermined voltage for 0.5 minute for voltage raising and 2.5 minutes for voltage maintenance so that a dry film thickness of 15 μm can be obtained. The coated panel was taken out of the electrodeposition bath, washed with water and baked at 170° C., 180° C. or 190° C. for 25 minutes, respectively, to give an electrodeposited coating film.

Evaluation

The following evaluations were made. The results are shown in Table 1.

(1) Gel Fraction

Each electrodeposited coating film obtained in the above manner was placed in a Soxhlet extractor and extracted with an acetone-methanol (1:1 by weight) mixture under refluxing conditions for 6 hours, and the gel fraction of the coating film was calculated as follows:

Gel fraction (%)=[weight after extraction (g)/weight before extraction (g)]×100.

(2) Impact Resistance

A weight of 500 g was allowed to fall from a height of 30 cm, 40 cm or 50 cm onto each electrodeposited coating film obtained in the above manner and the highest falling level at which no peeling of the coating film surface was observed was determined.

(3) Corrosion Prevention

Each electrodeposited coating film obtained in the above manner was given cuts about 10 cm long and reaching the substrate at 3-cm intervals, then immersed in a 3% aqueous solution of NaCl and allowed to stand under tightly closed conditions at 55° C. for 10 days. Thereafter, an adhesive tape was applied thereto and peeled off therefrom and the width of the portion peeled off from the electrodeposited coating film was measured for evaluating the corrosion prevention. The results are shown according to the following criteria:

○: The width of one-side peeling is not more than 3 mm.
Δ: The width of one-side peeling is more than 3 mm but less than 5 mm
X: The width of one-side peeling is 5 mm to whole surface.

TABLE 1

| | | Core | Amount of core | Amine | Gel fraction | | | Impact resistance (500 g, obverse side) | | | Corrosion prevention | | |
|---|---|---|---|---|---|---|---|---|---|---|---|---|---|
| | | | | | 170 | 180 | 190 | 170 | 180 | 190 | 170 | 180 | 190 |
| Example | 1 | Core of Prepn. Ex. 2 | 9% | — | 96 | 97 | 99 | 50 | 50 | 50 | ○ | ○ | ○ |
| | 2 | Core of Prepn. Ex. 2 | 9% | 6% | 90 | 93 | 94 | 50 | 50 | 50 | Δ | ○ | ○ |
| | 3 | Core of Prepn. Ex. 2 | 17% | — | 97 | 98 | 99 | 50 | 50 | 50 | ○ | ○ | ○ |
| | 4 | Core of Prepn. Ex. 2 | 17% | 6% | 97 | 100 | 100 | 50 | 50 | 50 | ○ | ○ | ○ |
| | 5 | Core of Prepn. Ex. 2 | 25% | — | 99 | 100 | 100 | 50 | 50 | 50 | ○ | ○ | |
| | 6 | Core of Prepn. Ex. 2 | 25% | 6% | 84 | 99 | 100 | 50 | 50 | 50 | ○ | ○ | ○ |
| | 7 | Core of Prepn. Ex. 3 | 25% | — | 85 | 89 | 100 | 50 | 50 | 50 | ○ | ○ | ○ |
| | 8 | Core of Prepn. Ex. 4 | 17% | — | 92 | 93 | 96 | 50 | 50 | 50 | Δ | ○ | ○ |
| | 9 | Core of Prepn. Ex. 5 | 17% | — | 95 | 99 | 100 | 50 | 50 | 50 | Δ | ○ | ○ |
| | 10 | Core of Prepn. Ex. 5 | 17% | 6% | 86 | 96 | 100 | 50 | 50 | 50 | X | ○ | ○ |
| | 11 | Core of Prepn. Ex. 6 | 17% | 6% | 86 | 96 | 100 | 50 | 50 | 50 | X | ○ | ○ |
| | 12 | Core of Prepn. Ex. 7 | 17% | — | 50 | 78 | 100 | 50 | 50 | 50 | X | ○ | ○ |
| | 13 | Core of Prepn. Ex. 8 | 17% | 6% | 79 | 91 | 100 | 50 | 50 | 50 | Δ | ○ | ○ |
| | 14 | Core of Prepn. Ex. 9 | 17% | 6% | 88 | 91 | 100 | 50 | 50 | 50 | ○ | ○ | ○ |
| | 15 | Core of Prepn. Ex. 10 | 17% | 6% | 80 | 90 | 100 | 50 | 50 | 50 | ○ | ○ | ○ |
| | 16 | Core of Prepn. Ex. 11 | 17% | 6% | 88 | 95 | 100 | 50 | 50 | 50 | ○ | ○ | ○ |
| | 17 | Core of Prepn. Ex. 12 | 17% | 6% | 91 | 98 | 100 | 50 | 50 | 50 | ○ | ○ | ○ |
| | 18 | Core of Prepn. Ex. 13 | 17% | 6% | 92 | 95 | 100 | 50 | 50 | 50 | ○ | ○ | ○ |
| | 19 | Core of Prepn. Ex. 14 | 17% | 6% | 87 | 97 | 100 | 50 | 50 | 50 | ○ | ○ | ○ |
| | 20 | Core of Prepn. Ex. 15 | 17% | — | 98 | 100 | 100 | 50 | 50 | 50 | ○ | ○ | ○ |
| | 21 | Core of Prepn. Ex. 16 | 17% | 6% | 97 | 97 | 100 | 50 | 50 | 50 | ○ | ○ | ○ |
| | 22 | Core of Prepn. Ex. 17 | 17% | 6% | 86 | 98 | 100 | 50 | 50 | 50 | ○ | ○ | ○ |
| | 23 | Core of Prepn. Ex. 18 | 17% | 3% | 92 | 98 | 100 | 50 | 50 | 50 | ○ | ○ | ○ |
| Compar Ex. | 1 | Not used | — | — | 97 | 97 | 100 | 30 | 30 | 30 | X | ○ | ○ |
| | 2 | Not used | — | 6% | 91 | 99 | 100 | 30 | 30 | 30 | X | ○ | ○ |

When electrodeposition coating was carried out using the cationic electrodeposition coating compositions respectively comprising the resin compositions of the present invention as obtained in Examples 1 to 23, the coating films showed higher levels of impact resistance as compared with those obtained in Comparative Examples 1 and 2 in which no core resin is contained in spite of the comparable levels of curability.

What is claimed is:

1. A resin composition
   which comprises a resin (A) and a resin (B) as constituents,
   said resin (A) having a number average molecular weight of 1,000 to 35,000 and having an unsaturated group, and
   being at least one member selected from the group consisting of following (A1) and (A2): (A1) a polyester polyol, a polyether polyol, a polycarbonate polyol, a polyurethane polyol, a polyolefin polyol and an acrylic polyol, (A2) a polymer obtained by reacting said (A1) with a compound having at least one functional group selected from the group consisting of isocyanato, carboxyl and epoxy groups within a molecule thereof, a dialkyl carbonate, a cyclic carbonate, an alcohol, or a mixture of these, and
   said resin (B) having a sulfonium group and a propargyl group within the molecule thereof,
   wherein at least one compound selected from the group consisting of a polybutadiene derivatives and 2-butyne-1,4-diol is used as a source of introduction of the unsaturated functional group into the resin (A).

2. The resin composition
   which comprises a resin (A) and a resin (B) as constituents,
   said resin (A) having a number average molecular weight of 1,000 to 35,000 and having an unsaturated group, and
   being at least one member selected from the group consisting of following (A1) and (A2): (A1) a polyester polyol, a polyether polyol, a polycarbonate polyol, a polyurethane polyol, a polyolefin polyol and an acrylic polyol, (A2) a polymer obtained by reacting said (A1) with a compound having at least one functional group selected from the group consisting of isocyanato, carboxyl and epoxy groups within a molecule thereof, a dialkyl carbonate, a cyclic carbonate, an alcohol, or a mixture of these, and
   said resin (B) having a sulfonium group and a propargyl group within the molecule thereof;
   wherein a polybutadiene derivative is used as a source of introduction of the unsaturated functional group into the resin (A).

3. The resin composition according to claim 1, wherein 2-butyne-1,4-diol is used as the source of introduction of the unsaturated functional group into the resin (A) in an amount of 1 to 50% by weight based on the solid matter in the resulting resin (A).

4. The resin composition according to claim 1,
   wherein the resin (A) occupies 5 to 80% by weight based on the total resin solid matter of the resin (A) and the resin (B).

5. A cationic electrodeposition coating composition
   which comprises the resin composition according to claim 1.

6. The resin composition according to claim 2,
   wherein the resin (A) occupies 5 to 80% by weight based on the total resin solid matter the resin (A) and the resin (B).

7. The resin composition according to claim 3,
   wherein the resin (A) occupies 5 to 80% by weight based on the total resin solid matter of the resin (A) and the resin (B).

8. A cationic electrodeposition composition
   which comprises the resin composition according to claim 2.

9. A cationic electrodeposition coating composition
   which comprises the resin composition according to claim 3.

10. A cationic electrodeposition coating composition
    which comprises the resin composition according to claim 4.

* * * * *